(12) United States Patent
Takami et al.

(10) Patent No.: US 10,752,369 B2
(45) Date of Patent: Aug. 25, 2020

(54) THRUST FORCE GENERATION DEVICE AND AIRCRAFT

(71) Applicant: MITSUBISHI HEAVY INDUSTRIES, LTD., Tokyo (JP)

(72) Inventors: Hikaru Takami, Tokyo (JP); Yuto Yokoi, Tokyo (JP)

(73) Assignee: MITSUBISHI HEAVY INDUSTRIES, LTD., Tokyo (JP)

(*) Notice: Subject to any disclaimer, the term of this patent is extended or adjusted under 35 U.S.C. 154(b) by 398 days.

(21) Appl. No.: 15/552,699

(22) PCT Filed: Feb. 24, 2016

(86) PCT No.: PCT/JP2016/055336
§ 371 (c)(1),
(2) Date: Aug. 22, 2017

(87) PCT Pub. No.: WO2016/136770
PCT Pub. Date: Sep. 1, 2016

(65) Prior Publication Data
US 2018/0044028 A1    Feb. 15, 2018

(30) Foreign Application Priority Data
Feb. 27, 2015   (JP) .................................. 2015-038282

(51) Int. Cl.
*B64D 27/02*    (2006.01)
*B64D 27/12*    (2006.01)
(Continued)

(52) U.S. Cl.
CPC ............. *B64D 27/12* (2013.01); *B64D 27/18* (2013.01); *B64D 27/24* (2013.01); *B64D 27/26* (2013.01);
(Continued)

(58) Field of Classification Search
CPC ........ B64D 2027/026; B64D 2027/266; B64D 27/12; B64D 27/18; B64D 27/24;
(Continued)

(56) References Cited

U.S. PATENT DOCUMENTS 6,247,668 B1   6/2001 Reysa et al.
9,404,507 B2 * 8/2016 Scarr ..................... B64D 29/06
(Continued)

FOREIGN PATENT DOCUMENTS

CN    1200343 A    12/1998
EP    1069044 A2   1/2001
(Continued)

OTHER PUBLICATIONS

Canada Patent Office, "Office Action for Canadian Patent Application No. 2977487," dated Jul. 24, 2018.
(Continued)

*Primary Examiner* — Claude J Brown
(74) *Attorney, Agent, or Firm* — Manabu Kanesaka; Benjamin Hauptman; Kenneth Berner (57) ABSTRACT

The thrust force generation device is provided with: a turbo fan engine unit that includes a generator for generating power using a rotation force of a drive shaft, and that drives a fan placed on the drive shaft using gas produced by combusting fuel; a motor driven fan unit that includes a motor driven by power supplied from the generator, that is placed in parallel with the turbo fan engine unit, and that drives a fan by using the motor; and a conducting unit that connects the generator to the motor, and supplies the power generated by the generator to the motor. The turbo fan engine unit and the motor driven fan unit are integrated with each other, and the conducting unit is placed between the turbo fan engine unit and the motor driven fan unit.

11 Claims, 5 Drawing Sheets

(51) Int. Cl.
  *B64D 27/24*  (2006.01)
  *B64D 27/26*  (2006.01)
  *F02K 5/00*   (2006.01)
  *B64D 27/18*  (2006.01)
  *F02C 6/00*   (2006.01)
  *F02C 7/20*   (2006.01)
  *F02K 3/06*   (2006.01)
  *F02C 3/04*   (2006.01)

(52) U.S. Cl.
  CPC .............. *F02C 6/00* (2013.01); *F02C 7/20* (2013.01); *F02K 3/06* (2013.01); *F02K 5/00* (2013.01); *B64D 2027/026* (2013.01); *B64D 2027/266* (2013.01); *F02C 3/04* (2013.01); *F05D 2220/32* (2013.01); *F05D 2220/76* (2013.01); *Y02T 50/44* (2013.01); *Y02T 50/62* (2013.01); *Y02T 50/671* (2013.01)

(58) Field of Classification Search
  CPC ... B64D 27/26; F02C 6/00; F02K 5/00; F05D 2220/76; Y02T 50/62
  USPC ............................................ 244/55
  See application file for complete search history.

(56) References Cited

U.S. PATENT DOCUMENTS

| | | | |
|---|---|---|---|
| 2006/0254255 A1 | 11/2006 | Okai et al. | |
| 2008/0184906 A1* | 8/2008 | Kejha | B64C 39/024 102/374 |
| 2009/0121073 A1 | 5/2009 | Doane et al. | |
| 2009/0139781 A1* | 6/2009 | Straubel | B60L 50/64 180/65.1 |
| 2009/0212155 A1* | 8/2009 | Huggins | B64D 27/26 244/54 |
| 2009/0229243 A1 | 9/2009 | Guemmer | |
| 2010/0100014 A1 | 4/2010 | Eshel et al. | |
| 2010/0219779 A1* | 9/2010 | Bradbrook | F02C 3/113 318/153 |
| 2011/0024567 A1* | 2/2011 | Blackwelder | B64D 15/12 244/134 D |
| 2011/0154805 A1* | 6/2011 | Heathco | F01D 15/10 60/226.1 |
| 2012/0128493 A1* | 5/2012 | Shelley | B64D 27/10 416/146 R |
| 2012/0209456 A1* | 8/2012 | Harmon | B64C 39/024 701/3 |
| 2013/0062455 A1 | 3/2013 | Lugg et al. | |
| 2013/0094963 A1 | 4/2013 | Rolt | |
| 2013/0240666 A1* | 9/2013 | Schnelz | B64D 27/26 244/54 |
| 2014/0173881 A1* | 6/2014 | Foster | F02C 7/20 29/525.02 |
| 2014/0360206 A1 | 12/2014 | Bradbrook | |
| 2014/0367510 A1 | 12/2014 | Viala et al. | |
| 2015/0013306 A1 | 1/2015 | Shelley | |
| 2015/0148993 A1* | 5/2015 | Anton | B64D 27/24 701/3 |
| 2015/0361879 A1* | 12/2015 | Suciu | F02C 3/10 244/54 |
| 2015/0367950 A1* | 12/2015 | Rajashekara | B64C 11/305 701/3 |
| 2016/0076446 A1 | 3/2016 | Bailey Noval et al. | |
| 2017/0104426 A1* | 4/2017 | Mills | H02S 40/32 |
| 2018/0002025 A1* | 1/2018 | Lents | B64D 27/10 |

FOREIGN PATENT DOCUMENTS

| | | |
|---|---|---|
| EP | 2998557 A1 | 3/2016 |
| FR | 2994707 A1 | 2/2014 |
| JP | 2006-205755 A | 8/2006 |
| JP | 2013-099158 A | 5/2013 |
| JP | 5453620 B2 | 3/2014 |
| WO | 2010042215 A1 | 4/2010 |

OTHER PUBLICATIONS

PCT, "International Search Report for International Application No. PCT/JP2016/055336" dated May 24, 2016.
PCT, "Written Opinion of the International Searching Authority for International Application No. PCT/JP2016/055336" dated May 24, 2016.
The "hFan" gas turbine-electric hybrid engine concept for Boeing's low-emissions sugar volt airliner design under NASA's subsonic fixed-wing project; Published on Jan. 27, 2014.
Europe Patent Office, "Office Action for European Patent Application No. 16755514.3," dated May 24, 2019.
Europe Patent Office, "Search Report for European Patent Application No. 16755514.3," dated Nov. 22, 2017.
China Patent Office, "Office Action for Chinese Patent Application No. 201680010192.1," dated Sep. 25, 2019.

* cited by examiner

THRUST FORCE GENERATION DEVICE AND AIRCRAFT

RELATED APPLICATIONS

The present application is National Phase of International Application No. PCT/JP2016/055336 filed Feb. 24, 2016, and claims priority from Japanese Application No. 2015-038282, filed Feb. 27, 2015, the disclosure of which is hereby incorporated by reference herein in its entirety.

TECHNICAL FIELD

The present invention relates to a thrust force generation device for generating thrust force, that is mounted on an aircraft; and to an aircraft.

BACKGROUND ART

With turbo fan engines mounted on aircraft, it is generally known that larger bypass ratios lead to better fuel efficiency. Here, "bypass ratio" is defined as the ratio of the amount of air passing through portions other than the core engine to the amount of air passing through the core engine. However, there is a limit to the miniaturization of the size of the core engine. As such, in order to increase the bypass ratio, the diameter of the engine body must be enlarged to increase the amount of bypassed air.

Figure 7:
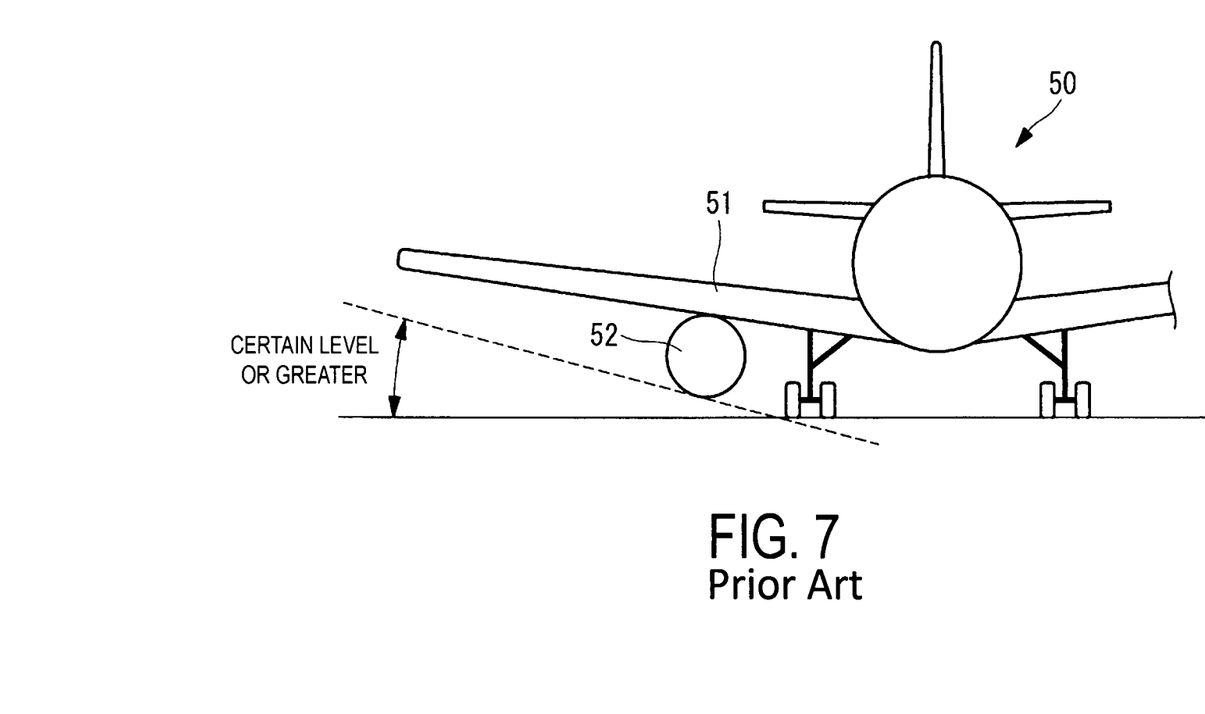
FIG. 7 is a front view illustrating an aircraft on which a conventional turbo fan engine is mounted.

However, as illustrated in FIG. 7, in the case of an aircraft 50 on which an engine 52 is mounted under a main wing 51, clearance from the ground must be secured. Therefore, there is also a limitation on the diameter of the main body of the engine 52. Accordingly, the upper limit of the bypass ratio of turbo fan engines is about 10.

Patent Document 1 below recites one turbo fan engine which generates thrust force and at least one electromagnetic driving fan which generates thrust force being placed on one wing, and that the electromagnetic driving fan is driven by power generated by a power generator provided in the turbo fan engine.

CITATION LIST

Patent Literature

Patent Document 1: Japanese Unexamined Patent Application Publication No. 2006-205755A

SUMMARY OF INVENTION

Technical Problem

Research is being carried out on an aircraft provided with a turbo fan engine, a power generator that generates power via the rotational force of the turbo fan engine, and a motor driven fan that includes a motor (electric motor) which drives the fan via power supplied from the power generator, wherein both the turbo fan engine and the motor driven fan generate thrust. However, specific research has not been conducted into the placement positions of the turbo fan engine and the motor driven fan.

For example, in a case where power generated by the power generator is supplied to the motor driven fan and drives the motor driven fan as a thrust force generation device, the supplied power will be high voltage. As such, a power supply line with a large cross-sectional area is preferable, but there is a problem in that such a power supply line would be a heavy object in the aircraft. Additionally, there is a problem in that, depending on the placement position of the power supply line, electromagnetic interference may be generated in the instrumentation of the aircraft. Therefore, the turbo fan engine, the motor driven fan, and the power supply line must be placed appropriately.

Additionally, specific research has not been conducted into a supporting structure for cases where the turbo fan engine and the motor driven fan are placed on the wing. Furthermore, the amount of air passing through portions other than the core engine of the turbo fan engine increases due to the driving of the motor driven fan. As such, it is possible to increase the bypass ratio of the entire thrust force generation device while maintaining the bypass ratio of the turbo fan engine at a conventional level. However, research has not been conducted into the control of the bypass ratio in accordance with the flight condition of the aircraft.

In light of these problems, an object of the present invention is to provide a thrust force generation device and an aircraft including the same. The device includes a thrust unit that generates thrust via fuel and a thrust unit that generates thrust via electric power, wherein both of the thrust units are appropriately and efficiently placed.

Solution to Problem

A thrust force generation device according to a first aspect of the present invention is provided with a first thrust unit including a generator that generates power via rotational forces of a drive shaft, and that drives a first fan using gas produced by burning fuel; a second thrust unit placed in parallel with the first thrust unit, including a motor driven by power supplied from the generator, and that drives a second fan using the motor; and a conducting unit connecting the generator to the motor, that supplies the power generated by the generator to the motor. In such a thrust force generation device, the first thrust unit and the second thrust unit are integrated with each other; and the conducting unit is placed between the first thrust unit and the second thrust unit.

According to this configuration, the first thrust unit and the second thrust unit are integrated with each other. As such, in cases where attaching the thrust force generation device to a wing, it is not necessary to transport and install the first thrust unit and the second thrust unit separately, and the units can be handled simultaneously as a single item. Additionally, the first thrust unit and the second thrust unit are placed proximate to each other, and the conducting unit placed between the first thrust unit and the second thrust unit is placed, for example, in a substantially linear manner across a short distance. As a result, compared to a case where spacing between the first thrust unit and the second thrust unit is large, weight of the conducting unit can be reduced, and power loss can be reduced. Furthermore, electromagnetic waves generated when electricity flows through the conducting unit are reduced, and electromagnetic interference that affects instrumentation installed in the aircraft can be suppressed.

In the first aspect of the invention described above, the first thrust unit and the second thrust unit may be housed in a single housing.

According to this configuration, the first thrust unit and the second thrust unit can be easily handled as a single item, and the effects of the electromagnetic waves on the outside can be reduced due to the shielding effects of the housing.

In the first aspect of the invention described above, the thrust force generation device may further include a control unit that adjusts thrust of the first thrust unit and the second thrust unit.

According to this configuration, the thrust force generated by the first thrust unit and the second thrust unit will each be adjusted, and as such, the proportion that the amount of air, not used in the burning of the fuel in the first thrust unit, occupies can be increased or decreased. As a result, the bypass ratio can be increased or decreased in accordance with, for example, the flight condition, fuel efficiency can be improved, noise can be reduced, and the like.

In the first aspect of the invention described above, the conducting unit may include a bus bar and a flexible member provided on the bus bar. The flexible member absorbs positional changes of the bus bar.

According to this configuration, a bus bar is used and, as such, high voltage electricity can be passed through the conducting unit. Additionally, the flexible member is, for example, a spring member or a bearing and absorbs positional changes of the bus bar. As such, damage to the conducting unit can also be avoided when the first thrust unit, the second thrust unit, or the conducting unit is subjected to external forces.

An aircraft according to a second aspect of the present invention includes the thrust force generation device described above; and a single first supporting part for hanging and supporting the thrust force generation device.

According to this configuration, the thrust force generation device, in which the first thrust unit and the second thrust unit are integrated, and which is hung and supported by the single first supporting part, is mounted on the aircraft.

In the second aspect of the invention described above, the aircraft may further include a second supporting part joined to the first thrust unit and a main wing, that bears a tensile load.

According to this configuration, a moment in the yawing direction is created in the first supporting part described above when the thrust force generated by the first thrust unit is greater than the thrust force generated by the second thrust unit, but deformation of the first supporting part can be suppressed due to the second supporting part bearing the tensile load.

Advantageous Effects of Invention

According to the present invention, in cases where a thrust force generation device includes a thrust unit that generates thrust via fuel and a thrust unit that generates thrust via electric power, both of the thrust units are appropriately and efficiently placed.

DESCRIPTION OF EMBODIMENTS

Hereinafter, a thrust force generation device to be mounted on an aircraft according to an embodiment of the present invention will be described.

Figure 1:
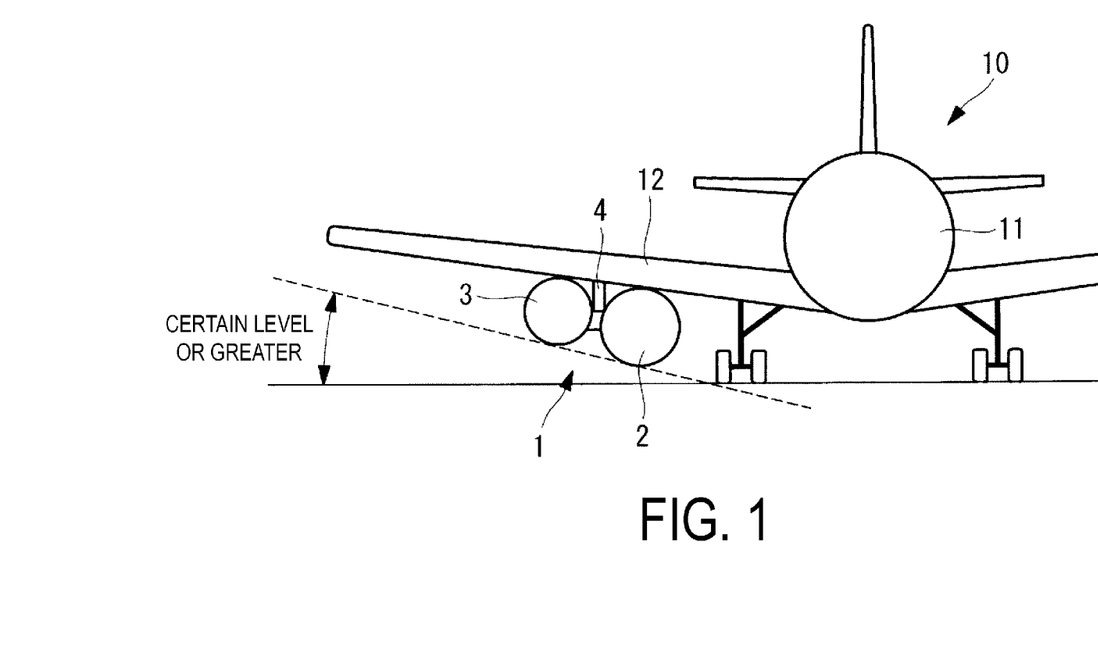
FIG. 1 is a front view illustrating an aircraft on which a thrust force generation device according to an embodiment of the present invention is mounted.

As illustrated in FIG. 1, a thrust force generation device 1 is, for example, mounted under a main wing 12 of an aircraft 10, and generates thrust force for propelling the aircraft 10. For example, one thrust force generation device 1 is mounted on one of the main wings 12. The thrust force generation device 1 is mounted as a pair on both of the main wings 12. The thrust force generation device 1 includes a turbo fan engine unit 2 and a motor driven fan unit 3. The turbo fan engine unit 2 and the motor driven fan unit 3 are provided in parallel.

Figure 2:
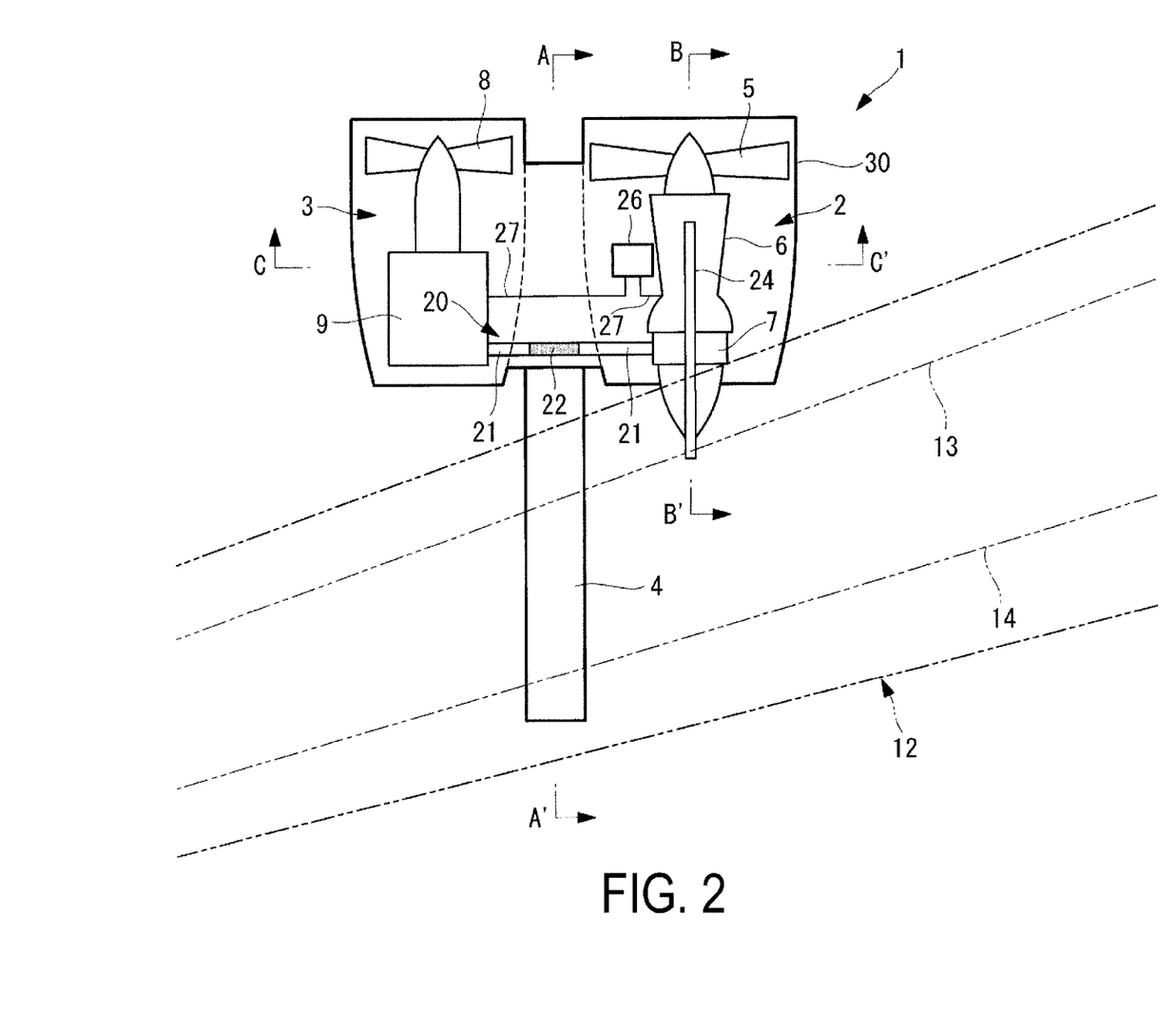
FIG. 2 is a vertical cross-sectional view illustrating the thrust force generation device according to an embodiment of the present invention.

In FIGS. 1 and 2, the turbo fan engine unit 2 is provided on a fuselage 11 side of the aircraft 10, and the motor driven fan unit 3 is provided outward of the turbo fan engine unit 2. The thrust force generation device 1 is mounted on both of the main wings 12 so that the turbo fan engine units 2 and the motor driven fan units 3 have left-right symmetry. Note that a configuration is possible in which the placement positions of the turbo fan engine unit 2 and the motor driven fan unit 3 are reversed from that illustrated in FIGS. 1 and 2, and the motor driven fan unit 3 may be provided on the fuselage 11 side.

Figure 3:
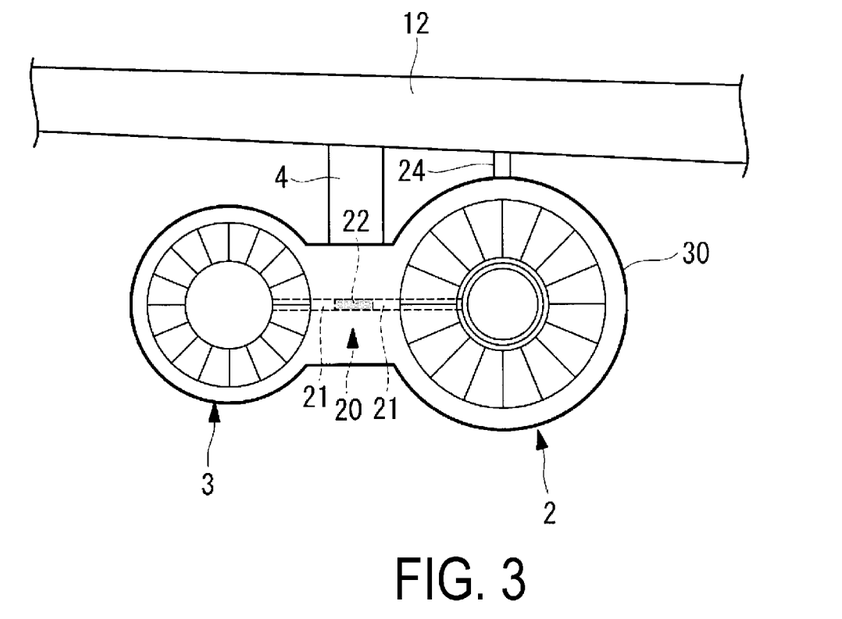
FIG. 3 is a back view illustrating the thrust force generation device according to an embodiment of the present invention.
Figure 4:
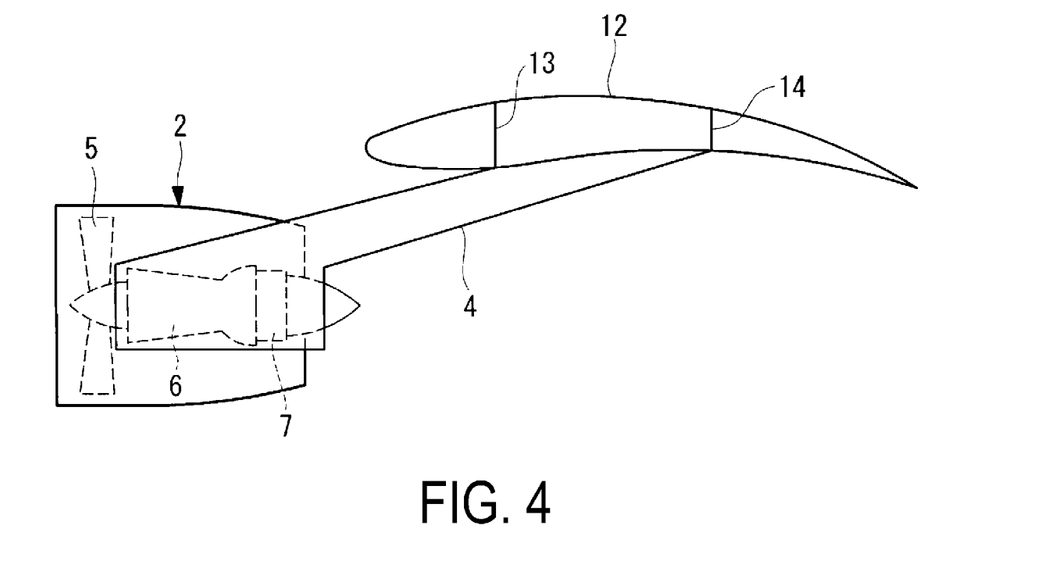
FIG. 4 is a vertical cross-sectional view taken along line A-A' in FIG. 2.

Maximum thrust force that can be generated by the thrust force generation device 1 is, for example, from 1 t to 100 t. As illustrated in FIGS. 3 and 4, the thrust force generation device 1 is hung from the main wing 12 by, for example, a single pylon (first supporting part) 4. The pylon 4 has, for example, a structural body such as a truss structure or the like. A first end side of the pylon 4 is connected to substantially a central portion of the thrust force generation device 1, and a second end side is connected to a structural body of the main wing 12 (a rib) (not illustrated), a front spar 13, a rear spar 14, or the like. The pylon 4 can withstand up-down directional, front-back directional, and left-right directional forces to which the pylon 4 is subjected.

The turbo fan engine unit 2 includes a fan 5, a core engine unit 6, a generator 7, and the like. The turbo fan engine unit 2 is divided into the core engine unit 6 provided on an axial line of the drive shaft; and a bypass unit around the core engine unit 6, through which air that has passed only through the fan 5 flows. The core engine unit 6 is constituted from a compressor, a turbine, a combustor, and the like. The fan 5, the compressor, the turbine, and the generator 7 are provided on the same drive shaft.

The combustor of the core engine unit 6 combusts fuel and produces high-temperature, high-pressure exhaust gas as a result of the combustion. The high-temperature, high-pressure exhaust gas is jetted from a nozzle, and the jet of this exhaust gas forms a portion of the thrust. Additionally, the exhaust gas produced by the combustion causes the turbine to rotate. The fan 5 and the compressor are rotatably driven by the rotational force of the turbine. The compressor compresses air taken in through an air intake port of the turbo fan engine unit 2, and delivers the compressed air to the compressor.

The fan 5 is a ducted fan. The air that has passed through the fan 5 is jetted from a fan nozzle and generates thrust.

The generator 7 rotates due to the rotational force of the turbine and generates electric power. The electric power generated by the generator 7 is supplied to the motor driven fan unit 3 and the like.

The motor driven fan unit 3 includes a fan 8, a motor 9, and the like. The fan 8 and the motor 9 are provided on the same shaft.

The motor 9 is rotatably driven by the electric power supplied from the generator 7 of the turbo fan engine unit 2. The fan 8 is rotatably driven by the rotational force of the motor 9. The fan 8 is a ducted fan. The air that has passed through the fan 8 is jetted from a fan nozzle and generates thrust.

The generator 7 of the turbo fan engine unit 2 and the motor 9 of the motor driven fan unit 3 are connected to each other by a conducting unit 20 through which electricity flows, and electric power is supplied from the generator 7 to the motor 9. The conducting unit 20 has a structure and a size capable of withstanding current (e.g. from thousands to tens of thousands of amperes) that flows when the motor driven fan unit 3 exerts maximum thrust force.

For example, the conducting unit 20 is constituted from a metal bus bar 21, a flexible member 22, and the like, and the bus bar 21 and the flexible member 22 are connected to each other. A first end side of the conducting unit 20 is connected to the generator 7, and a second end portion is connected to the motor 9. The bus bar 21 is, for example, a metal plate-like member or rod-like member; and the flexible member 22 is, for example, a net-like member of networked metal wire members, a spring member with elasticity, or the like.

As illustrated in FIGS. 2 and 3, the flexible member 22 is provided at a middle portion of the conducting unit 20, that is, between two of the bus bars 21. Note that a configuration is possible in which the flexible member 22 is provided between the generator 7 and the bus bar 21, or between the motor 9 and the bus bar 21. By providing the flexible member 22, even when subjected to external forces and the relative positions of the turbo fan engine unit 2 and the motor driven fan unit 3 change, the flexible member 22 will elastically deform and, as a result, disconnections of the conducting unit 20 will not occur and damage to the conducting unit 20 and the like can be avoided.

Note that a configuration is possible in which a bearing is used as the flexible member 22. The bearing is placed such that the electrical connection of the bus bar 21 is maintained even if the relative positions of the turbo fan engine unit 2 and the motor driven fan unit 3 change.

The conducting unit 20 is installed in a housing 30. As a result, the conducting unit 20 is not exposed to the outside and insulation of the conducting unit 20 can be secured. Additionally, by using a shielding material (e.g. a metal plate member or net-like member) on the housing 30 or on a separate member (not illustrated) covering the conducting unit 20, electromagnetic interference that affects instrumentation installed in the aircraft 10 can be suppressed.

Furthermore, the turbo fan engine unit 2 and the motor driven fan unit 3 are placed proximate to each other and, as such, the conducting unit 20 is placed in a substantially linear form across a short distance between the turbo fan engine unit 2 and the motor driven fan unit 3, without having to go around the main wing 12 and the like to be installed. Accordingly, because the length of the conducting unit 20 is short, the weight of the conducting unit 20 can be reduced, which contributes to the reduction of the overall weight of the aircraft 10 and, moreover, power loss can be reduced. Furthermore, electromagnetic waves generated when electricity flows through the conducting unit 20 are reduced, and electromagnetic interference that affects instrumentation installed in the aircraft 10 can be suppressed.

In cases where the turbo fan engine unit 2 and the motor driven fan unit 3 are integrated together and the thrust force generation device 1 is attached to the main wing 12, it is not necessary to separately transport and install the turbo fan engine unit 2 and the motor driven fan unit 3, and the units can be handled simultaneously as a single item. For example, the turbo fan engine unit 2 and the motor driven fan unit 3 are housed in the single housing 30 surrounding both of the units. Here, the conducting unit 20 is installed in the same housing 30 in which the turbo fan engine unit 2 and the motor driven fan unit 3 are housed. As a result, the turbo fan engine unit 2 and the motor driven fan unit 3 can be easily handled as a single item, and the effects of the electromagnetic waves on the outside can be reduced due to the shielding effects of the housing 30.

Note that a partition plate may be provided in the housing 30 between the turbo fan engine unit 2 and the motor driven fan unit 3. Therefore, fire can be prevented from spreading from the turbo fan engine unit 2 to the motor driven fan unit 3, the strength of the thrust force generation device 1 can be improved, and the like. The housing 30 is, for example, constituted by metal plates or carbon fiber reinforced plastic plates.

Figure 5:
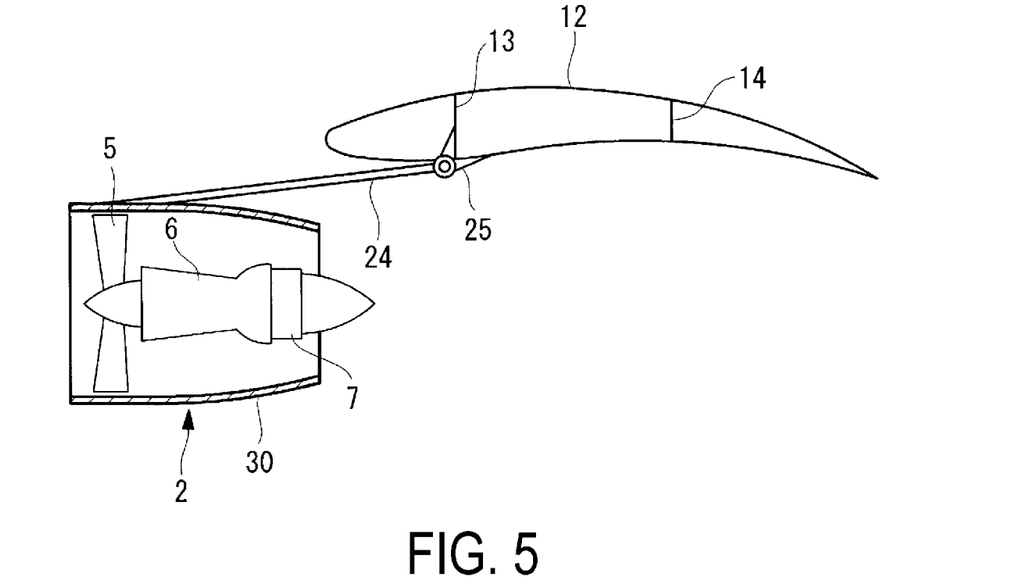
FIG. 5 is a vertical cross-sectional view taken along line B-B' in FIG. 2.

As illustrated in FIGS. 2, 3, and 5, a strut (second supporting part) 24 is provided between the turbo fan engine unit 2 of the thrust force generation device 1 and the main wing 12. The strut 24 is parallel to the axial line of the turbo fan engine unit 2. A first end side of the strut 24 is connected to the turbo fan engine unit 2, and a second end side of the strut 24 is connected to a structural body (rib, front spar 13, or the like) of the main wing 12 via a mounting bracket 25. The strut 24 is a structural body capable of withstanding the tensile load, and is, for example, a wire member.

In cases where the motor driven fan unit 3 has stopped and only the turbo fan engine unit 2 is being driven, or in cases where the thrust force of the turbo fan engine unit 2 is greater than that of the motor driven fan unit 3, a moment is created in the yawing direction of the pylon 4 due to the turbo fan engine unit 2 trying to get out in front of the motor driven fan unit 3. In such cases, deformation of the pylon 4 is suppressed due to the strut 24 being provided and bearing the tensile load.

Figure 6:
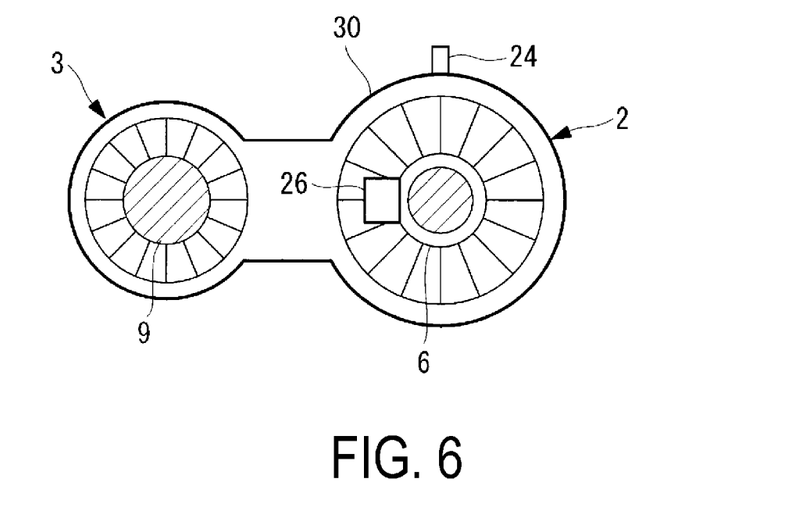
FIG. 6 is a vertical cross-sectional view taken along line C-C' in FIG. 2.

As illustrated in FIGS. 2 and 6, a thrust force control device 26 is provided in the housing 30, and adjusts the thrust of each of the turbo fan engine unit 2 and the motor driven fan unit 3. The thrust force control device 26 is connected to the generator 7 and the motor 9 and sends and receives control signals to and from the generator 7 or the motor 9 via control wires 27.

The thrust force control device 26 sets the total thrust of the turbo fan engine unit 2 and the motor driven fan unit 3 to maximum when the aircraft 10 is taking off. On the other hand, when cruising, the thrust force control device 26 first lowers the thrust force of the turbo fan engine unit 2. As a result, when cruising, the amount of air passing through the motor driven fan unit 3 will be relatively greater than the amount of air passing through the turbo fan engine unit 2, and the bypass ratio when cruising will be greater than the bypass ratio when taking off.

With the thrust force generation device 1 according to the present embodiment, air is jetted from the motor driven fan unit 3 when driving the thrust force generation device 1. As a result, the amount of air not passing through the core engine unit 6 of the turbo fan engine unit 2 increases compared to conventional cases where only a thrust force generation device is mounted. Therefore, as illustrated in FIG. 1, the bypass ratio can be increased so as to be greater than conventional while securing clearance from the ground. When the bypass ratio is increased, fuel efficiency can be improved and noise can be reduced. Additionally, in cases where it is preferable to achieve a bypass ratio similar to that of a case where only a conventional turbo fan engine is provided, the amount of air not passing through the core engine unit 6 of the turbo fan engine unit 2 can be complemented by the motor driven fan unit 3. As such, the overall height of the thrust force generation device 1 can be reduced.

The proportion of the thrust of each of the turbo fan engine unit 2 and the motor driven fan unit 3 can be appropriately adjusted and, as such, the bypass ratio can be made variable. Accordingly, flight at an optimal bypass ratio, in accordance with the flight condition such as when taking off, when cruising, when landing, or the like, is possible.

With the thrust force generation device 1 according to the present embodiment, the turbo fan engine unit 2 and the motor driven fan unit 3 are integrated together. As a result, compared to cases where each of the units is installed separately, the work of installing the thrust force generation device 1 on the aircraft 10 and the structure of the aircraft 10 can be simplified. That is, in cases where installing one thrust force generation device 1 on each of the main wings 12, only the single pylon 4 attached to each main wing 12 is needed and the work of installation need only be performed at a single location per wing.

Additionally, it is possible to remove the turbo fan engines from existing aircraft on which turbo fan engines are installed, and replace them with the thrust force generation device 1 according to the present embodiment. In this case, the pylon is also required to be replaced, but major changes to the reinforcing structures of the main wings is not necessary.

Moreover, according to the present embodiment, the strut 24 is provided between the turbo fan engine unit 2 and the main wing 12. As such, the load in the yawing direction to which the pylon 4 is subjected can be reduced.

In consideration of the current that flows when the motor driven fan unit 3 exerts maximum thrust force and also in consideration of the size and structure of the conducting unit 20, in cases where placing a conducting unit on the main wing 12, there is a possibility of the structure becoming complex or electromagnetic interference being generated in the instrumentation installed in the aircraft 10 due to electromagnetic waves that are generated. However, according to the present embodiment, the turbo fan engine unit 2 and the motor driven fan unit 3 are placed close to each other and the conducting unit 20 is placed in a linear form across a short distance. As a result, a simple structure can be achieved, weight and power loss can be reduced, and the effects of electromagnetic interference can be reduced. Additionally, not only the bus bar 21, but also the flexible member 22 is installed as the conducting unit 20, as such, damage to the conducting unit 20 and the like can be avoided.

REFERENCE SIGNS LIST

1 Thrust force generation device
2 Turbo fan engine unit
3 Motor driven fan unit
4 Pylon (first supporting part)
5 Fan (first fan)
6 Core engine unit
7 Generator
8 Fan (second fan)
9 Motor
10 Aircraft
11 Fuselage
12 Main wing
13 Front spar
14 Rear spar
20 Conducting unit
21 Bus bar
22 Flexible member
24 Strut (second supporting part)
26 Thrust force control device (control device)
27 Control wire
30 Housing

The invention claimed is:

1. A thrust force generation device, comprising:
a first thrust unit including a generator that generates power via rotational forces of a first drive shaft, and that drives a first fan provided on the first drive shaft with using gas produced by burning fuel;
a second thrust unit which is placed in parallel with the first thrust unit, including a motor which is provided on a second drive shaft with a second fan and which is driven by power supplied from the generator, the motor rotating the second drive shaft placed in parallel with the first drive shaft and driving the second fan; and
a conducting unit connecting the generator to the motor, that supplies the power generated by the generator to the motor; wherein
the first thrust unit and the second thrust unit are integrated with each other; and
the conducting unit is placed between the first thrust unit and the second thrust unit.

2. The thrust force generation device according to claim 1, wherein:
the first thrust unit and the second thrust unit are housed in a single housing.

3. The thrust force generation device according to claim 1, further comprising a control unit that adjusts thrust of the first thrust unit and the second thrust unit.

4. The thrust force generation device according to claim 1, wherein:
the conducting unit includes
a bus bar, and
a positional change absorber provided on the bus bar, that absorbs positional changes of the bus bar.

5. The thrust force generation device according to claim 4, wherein the positional change absorber is an elastic deforming member.

6. The thrust force generation device according to claim 4, wherein the positional change absorber is a net-like member of networked metal wire members or a spring member with elasticity or a bearing.

7. An aircraft, comprising:
the thrust force generation device according to claim 1; and
a single first supporting part for hanging and supporting the thrust force generation device.

8. The aircraft according to claim 7, further comprising a second supporting part joined to the first thrust unit and a main wing, that bears a tensile load.

9. The thrust force generation device according to claim 1, wherein the first thrust unit includes a core engine unit which drives the first fan.

10. The thrust force generation device according to claim 1, wherein the conducting unit mechanically connects the generator to the motor, and supplies the power generated by the generator to the motor.

11. The thrust force generation device according to claim 1, wherein the conducting unit is placed in a substantially linear form between the first thrust unit and the second thrust unit.

* * * * *